E. ROSENBERG.
CONSTANT OUTPUT GENERATOR.
APPLICATION FILED MAY 17, 1907.
1,084,365.
Patented Jan. 13, 1914.
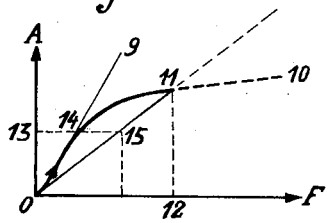
Fig. 2.
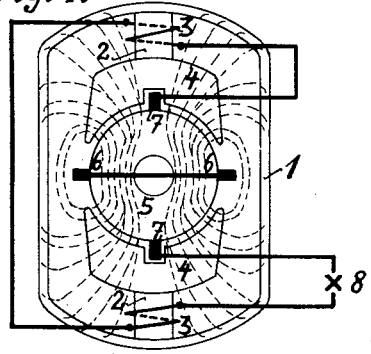
Fig. 1.
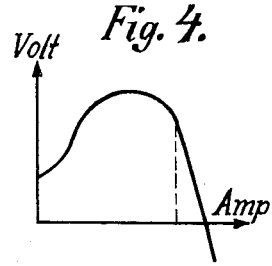
Fig. 4.
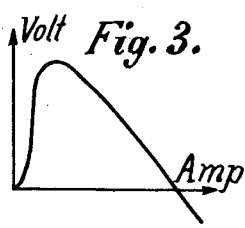
Fig. 3.
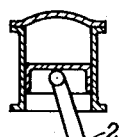
Fig. 6.
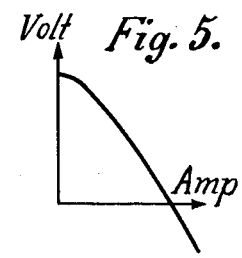
Fig. 5.
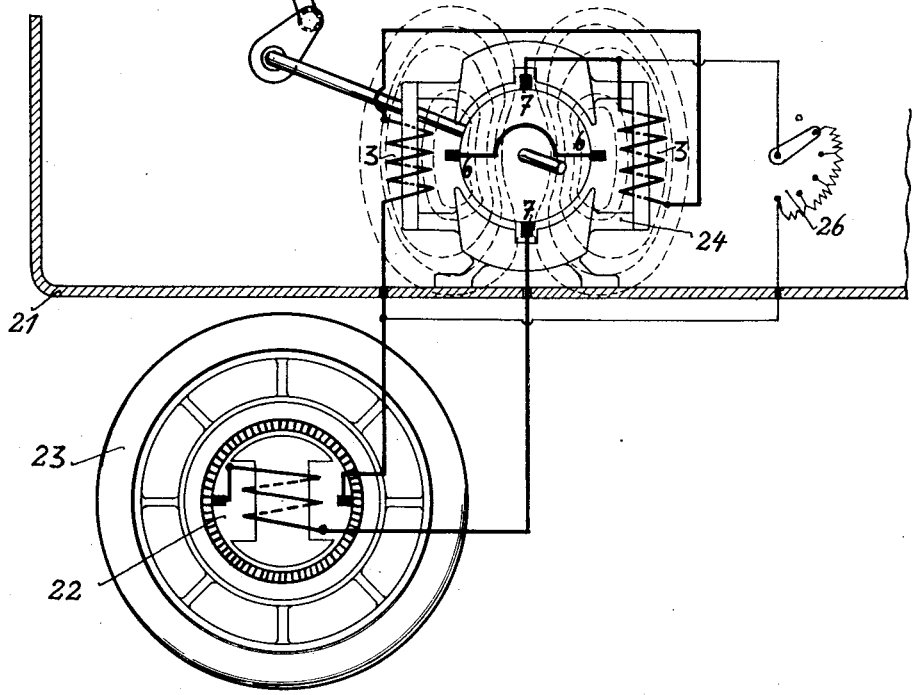
Witnesses.
Jean Verissi.
Paul Heinrich.
Inventor.
Emanuel Rosenberg

UNITED STATES PATENT OFFICE.

EMANUEL ROSENBERG, OF BERLIN, GERMANY.

CONSTANT-OUTPUT GENERATOR.

1,084,365. Specification of Letters Patent. Patented Jan. 13, 1914.

Application filed May 17, 1907. Serial No. 374,294.

*To all whom it may concern:*

Be it known that I, EMANUEL ROSENBERG, a subject of the Emperor of Austria-Hungary, residing at Berlin, Germany, have invented certain new and useful Improvements in Constant-Output Generators, of which the following is a specification.

My invention relates to dynamo electric machines, and its object is to provide a novel arrangement whereby a voltage characteristic falling rapidly with increasing current can be obtained with a series excitation.

For certain purposes, machines in which the voltage falls rapidly with increasing current are desirable, and it has been proposed by me jointly with Heinrich Rosenberg in United States Patent No. 954,468, of April 12, 1910, to secure this result by providing a machine with a constant field excitation and arranging the commutator brushes and connections in such a manner that the armature current opposes the field magnetization, so that the greater the current the weaker the field becomes, and consequently the lower the induced voltage. When such machines are used on circuits in which resistance and current vary widely, it is evident that the constant field excitation desired cannot be obtained in any simple manner without employing a separate exciter.

The object of my present invention is to render it possible to use a series-wound field, so the machine may be self-exciting and yet possess similar characteristics as that have been secured heretofore with separate excitation.

My invention consists in so arranging the field magnet that, beginning from a certain point, the armature current, as it increases, produces a proportionately greater effect than the same current in the field winding. I secure this result in two ways. First, by arranging a portion of the field magnet, for instance, the field poles carrying the coils so that it becomes saturated at a certain value of current; and second, by providing a leakage-path of low reluctance for the armature flux.

My invention will best be understood by reference to the accompanying drawings, in which—

Figure 1 shows diagrammatically a dynamo electric machine arranged in accordance with my invention; Figs. 2, 3, 4 and 5 are explanatory diagrams. Fig. 6 shows the dynamo mounted on a motor car, driven by a prime mover and feeding an electric motor.

In Fig. 1, 1 represents the field magnet, which is provided with poles. The portions of these poles 2 which carry the field coils 3 are comparatively small, while the pole shoes 4 are comparatively large. 5 represents the armature, which is provided with commutator brushes 6—6 short circuiting the armature on a line displaced 90 electrical degrees from the line of field magnetization. A second set of brushes 7—7 are displaced 90 electrical degrees from the brushes 6—6 and are connected to the external circuit 8. The field coils 3 are connected in series with the external circuit.

The particular arrangement of brushes which I have shown is the same that has been suggested in the above mentioned patent for causing the main current of the armature to oppose the field magnetization. The rotation of the armature in the field produces a difference of potential between the brushes 6—6, which results in a short circuit current flowing through these brushes. This current magnetizes the armature at right angles to the line of field magnetization, and this secondary magnetization produces an electromotive force, due to rotation, between the brushes 7—7, which electromotive force is impressed upon the external circuit. Brushes 7—7 are so placed that the armature current that flows through them tends directly to demagnetize the primary field, so that with a constant field magnetization the terminal voltage of the machine will drop rapidly with increase of current.

When the machine is series-wound, as shown in Fig. 1, it is evident, that not only the demagnetizing effect of the armature current, but also the magnetizing effect of the current in the field coils would increase directly with the current in the external circuit, were it not for the special construction that I employ, which forms the subject-matter of my invention. In order to prevent the increase of current in the field coils 3 from producing a proportionately increased magnetization, the field poles on which these are wound are so dimensioned that they become saturated when the current in the coils reaches a certain value, while owing to the large surface of the pole shoes, to their proximity to each other and to the proximity of the field magnet yoke to the pole shoes, a leakage-path of low reluctance is offered to the armature flux, so that the demagnetizing effect of the armature current increases steadily with the increase of current in the external circuit. The leakage flux of the armature field is shown in dotted lines in Fig. 1. Of course there is also a leakage of the primary field but its lines of force are not especially drawn.

The operation of my machine will perhaps be more clearly understood by reference to Fig. 2. In Fig. 2 I have shown two lines representing the proportionate effect of the currents in the field and armature, first with a machine with moderately saturated iron and moderate leakage-path and second, with a machine having a field magnet arranged in accordance with my invention. In the figure the axis OA represents armature ampere turns, while the axis OF represents field ampere turns that would be required to balance the armature ampere turns for any given value of current. The straight line 0—9 represents the relations of field and armature ampere turns without saturation and leakage, while the curve 0—10 represents the relation under the conditions of saturation and leakage shown in Fig. 1. Up to a certain point on the curve, the magntizing effect of the armature and field ampere turns increases proportionately, then as the point of saturation of the portions of the field poles carrying the field coils is reached, a greater proportionate increase in field ampere turns is required to balance a given increase in armature ampere turns.

By means of the curve 0—10 the machine may readily be designed to give a main current of any desired value if the external circuit 8 is short circuited. When the number of turns of the armature has been decided upon and the desired current for the short-circuit selected, a point 11 may be located on the curve 0—10 such that the line 11—12 equals the selected armature ampere turns. The field ampere turns will then be equal to 0—12, and consequently if a number of field turns are chosen which bear to the effective armature turns a ratio of 0—12 to 11—12, the short circuit current of the machine will be that desired, provided that the ohmic resistance can be left out of account. For any smaller current, as, for instance, that current for which the armature ampere turns are equal to the line 0—13 the field ampere turns would be equal to the line 13—15, and of this only the portion equal to the line 13—14 is required to compensate for the armature magnetization. The remaining magnetomotive force, corresponding to the line 14—15 is available for producing an effective magnetization, resulting in an induced voltage at the armature terminals.

The voltage characteristic of a machine arranged in accordance with my invention is as shown in Fig. 3, in which the abscissas represent current and the ordinates voltage. Voltage characteristics as Fig. 4 and Fig. 5 may be secured by selecting a material of high residual magnetism for the field magnet and providing the coils with a suitable number of turns. By arranging a regulating rheostat in shunt to the exciting coil the output of the dynamo and the maximum of the current can be varied at will.

The curves 3, 4 and 5 have a portion, in which the voltage varies in nearly inverse proportion with the current. The curve representing ideal constant output would be a hyperbola. Now one can easily draw two such parallel hyperbolas for slightly different outputs which will contain in the space between them quite a big portion of the drooping part of the dynamo curve. For this portion the dynamo may be called a constant output dynamo. A variation of the outer resistance, within these limits, does practically not affect the output of the dynamo which, in consequence, will be a suitable generator for arc lamps, arc welding, melting and other purposes.

In Figs. 3, 4 and 5 I have shown the curves extending below the horizontal axis. This means that if the current is in some manner increased above the value which was selected as the short-circuit current in the design of the machine, the induced voltage at the armature terminals will be reversed. Consequently, if such a machine is used as a booster, it will give a positive voltage up to a certain current-value, and a negative voltage for currents above that value.

The dynamo can be used also as a generator in vehicles with electric transmission of the driving power in order to avoid an overloading of the prime mover and to develop automatically a lower voltage when the current grows in climbing hills. In Fig. 6 a motor car 21 is shown with electric motor 22 driving the wheels 23, the electric motor, in series with the coils 3 3 of the dynamo, receiving current from the brushes 7 7 of the dynamo, the other brushes 6 6 being short-circuited. The field magnet 24 is here designed in the manner of the old Manchester type in order to economize in weight. The armature leakage flux is shown in dotted lines. The dynamo is directly coupled with the engine 25. A regulating rheostat 26 is arranged in shunt to the exciting coils of the dynamo. By this means, it is possible to vary the input of the motors and even to stop the car without touching the main circuit.

It will be seen that I have illustrated my invention diagrammatically for the sake of simplicity, and consequently I do not desire to limit myself to the particular construction and arrangement of parts here shown, but aim in the appended claims to cover all modifications which are within the scope of my invention.

What I claim as new and desire to secure by Letters Patent of the United States, is:

1. In a dynamo electric machine, a series-wound field magnet having a portion arranged to be saturated by a fraction of full load current, an armature provided with a commutator, and commutator brushes positioned to produce, with the armature windings, circuits in which the current opposes the field magnetization.

2. In a dynamo electric machine, a series-wound field magnet structure, an armature provided with a commutator, and commutator brushes positioned to produce, with the armature windings, circuits in which the current opposes the field magnetization, the said field magnet structure comprising a yoke, massive pole pieces having a path of low reluctance for the armature flux, and connecting portions between the yoke and the pole pieces, the said connecting portions being so reduced in cross section as to become saturated by a fraction of full load current.

3. In a dynamo electric machine, a series-wound field magnet structure, an armature provided with a commutator, and commutator brushes and connections short-circuiting the armature on a line displaced 90 electrical degrees from the line of field magnetization, and a second set of brushes displaced 90 electrical degrees from the first set and connected to an external circuit, the said field magnet structure comprising a yoke, massive pole pieces, having a path of low reluctance for the armature flux, and connecting portions between the yoke and pole pieces, said connecting portions being so reduced in cross section, as to become saturated by a fraction of full load current.

4. In a dynamo-electric machine, a series-wound field magnet having a portion arranged to be saturated by a fraction of full load current, an armature provided with a commutator, and commutator brushes positioned to produce, with the armature winding, circuits in which the current opposes the field magnetization, the field magnet having a leakage-path of low reluctance for the armature flux.

5. In a dynamo-electric machine, a series-wound field magnet having a portion arranged to be saturated by a fraction of full-load current, an armature provided with a commutator, commutator brushes and connections short-circuiting the armature on a line displaced ninety electrical degrees from the line of field magnetization, and a second set of brushes displaced ninety electrical degrees from the first set and connected to the series coil and an external circuit, the field magnet having a leakage-path of low reluctance for the flux produced by the current passing through the second set of brushes.

6. In a dynamo-electric machine, a series-wound field magnet having a portion arranged to be saturated by a fraction of full-load current, an armature provided with a commutator, commutator brushes and connections short-circuiting the armature on a line displaced ninety electrical degrees from the line of field magnetization, and a second set of brushes displaced ninety electrical degrees from the first set and connected to the series coil and an external circuit.

7. In a dynamo-electric machine, a field magnet having a portion arranged to be saturated by a fraction of full load current, a series coil on the field magnet, a regulating rheostat in parallel to the series coil, an armature provided with a commutator, commutator brushes and connections short-circuiting the armature on a line displaced ninety electrical degrees from the line of field magnetization, and a second set of brushes displaced ninety electrical degrees from the first set and connected to the series coil and an external circuit, the field magnet having a leakage-path of low reluctance for the flux produced by the current passing through the second set of brushes.

8. In a dynamo-electric machine, a series-wound field magnet having a portion arranged to be saturated by a fraction of full-load current, an armature provided with a commutator, commutator brushes and connections short-circuiting the armature on a line displaced ninety electrical degrees from the line of field magnetization, and a second set of brushes displaced ninety electrical degrees from the first set and connected to the series coil and to an electric motor.

9. A series-wound dynamo-electric machine having means for reducing the proportionate magnetizing effect of the series field winding as the current therein increases, an armature with a commutator, commutator brushes and connections short-circuiting the armature on a line displaced 90 electrical degrees from the line of field magnetization, and a second set of brushes displaced 90 electrical degrees from the first set and connected to the said series-winding and to an external circuit.

10. In a dynamo electric machine, a field magnet having a portion arranged to be saturated by a fraction of full load, a series exciting coil on the field magnet connected in parallel to a regulating rheostat, an armature provided with a commutator, commutator brushes and connections short circuiting the armature on a line displaced 90 electrical degrees from the line of field magnetization, and a second set of brushes displaced 90 electrical degrees from the first set and connected to the series coil and to an external circuit.

In witness whereof, I have hereunto set my hand this second day of May, 1907.

EMANUEL ROSENBERG.

Witnesses:
　JEAN VERISSI,
　PAUL HEINRICH.